(12) United States Patent
Mleczko et al.

(10) Patent No.: US 12,330,345 B2
(45) Date of Patent: Jun. 17, 2025

(54) ROBOTIC SEPARATION OF PLASTICS FOR CHEMICAL RECYCLING

(71) Applicant: Anellotech, Inc., Pearl River, NY (US)

(72) Inventors: Leslaw Mleczko, Dormagen (DE); Yu-Ting Cheng, Pearl River, NY (US); Gregory S. Coil, Pearl River, NY (US); Harley Freeman, Pearl River, NY (US)

(73) Assignee: Anellotech, Inc., Pearl River, NY (US)

( * ) Notice: Subject to any disclaimer, the term of this patent is extended or adjusted under 35 U.S.C. 154(b) by 717 days.

(21) Appl. No.: 17/549,893

(22) Filed: Dec. 14, 2021

(65) Prior Publication Data

US 2022/0184855 A1    Jun. 16, 2022

Related U.S. Application Data

(60) Provisional application No. 63/125,282, filed on Dec. 14, 2020.

(51) Int. Cl.
| | | |
|---|---|---|
| *B29B 17/04* | (2006.01) | |
| *B29B 17/02* | (2006.01) | |
| *C08J 11/16* | (2006.01) | |
| *B29B 17/00* | (2006.01) | |

(52) U.S. Cl.
CPC .............. *B29B 17/04* (2013.01); *B29B 17/02* (2013.01); *C08J 11/16* (2013.01); *B29B 2017/001* (2013.01); *B29B 2017/022* (2013.01); *B29B 2017/0275* (2013.01); *B29B 2017/0282* (2013.01); *B29B 2017/0496* (2013.01); *C08J 2327/06* (2013.01)

(58) Field of Classification Search
USPC ........................................ 528/190; 521/46.5
See application file for complete search history.

(56) References Cited

U.S. PATENT DOCUMENTS

| | | |
|---|---|---|
| 5,134,291 A | 7/1992 | Ruhl et al. |
| 8,420,875 B1 | 4/2013 | Mackay |
| 10,173,207 B2 | 1/2019 | Mazanec et al. |
| 10,336,628 B2 | 7/2019 | Shi et al. |
| 10,427,988 B2 | 10/2019 | Michel et al. |
| 10,688,544 B2 | 6/2020 | Gitschel |
| 10,703,649 B2 | 7/2020 | Jian et al. |
| 11,069,053 B2 | 7/2021 | Horowitz |
| 11,097,283 B2 | 8/2021 | Schultz |
| 2006/0115037 A1 | 6/2006 | Pedersen et al. |
| 2020/0362248 A1 | 11/2020 | Cartolano |

FOREIGN PATENT DOCUMENTS

| | | | | |
|---|---|---|---|---|
| CN | 106574196 A | * | 4/2017 | ............... B09B 3/00 |
| EA | 010719 B1 | * | 10/2008 | ........... F25J 3/04412 |

OTHER PUBLICATIONS

Huber, G.W. et al, "Synthesis of Transportation Fuels from Biomass: Chemistry, Catalysts, and Engineering," Chem. Rev. 106, (2006), pp. 4044-4098.
"How AI Machine Learning and Robotics are Solving the Plastic Sorting Crisis—Plug and Play Tech Center" Retrieved From the Internet Oct. 4, 2022 https://www.plugandplaytechcenter.com/resources/how-ai-and-robotics-are-solving-plastic-sorting-crisis/.
Arvanitoyannis, I.S. and Bosnea, L. A., "Recycling of polymeric materials used for food packaging: current status and perspectives," Food Rev. Int. 17(3), (2001), 291-346.
Hopewell J. et al. "Plastics recycling: challenges and opportunities", Phil. Trans. R. Soc. B (2009) 364, 2115-2126.
Duangchan, A. and Samart C.. "Tertiary recycling of PVC-containing plastic waste by copyrolysis with cattle manure," Waste Management 28 (2008), 2415-2421.
Xu et al., "Catalytic fast pyrolysis of polyethylene terephthalate plastic for the selective production of terephthalonitrile under ammonia atmosphere", Waste Management 92 (2019) 97-106.
International Search Report from International Application No. PCT/US2021/063171 date of mailing Apr. 28, 2022.
Written Opinion of the International Search Authority from International Application No. PCT/US2021/063171 date of mailing Apr. 28, 2022.
Lahtela et al., "Mechanical Sorting Processing of Waste Material Before Composite Manufacturing—A Review", Journal of Engineering Science and Technology Review 11 (6) (2018) 35-46.
Wang et al., "Recycling benzene and ethylbenzene from in-situ catalytic fast pyrolysis of plastic wastes", Energy Conversion and Management 200 (2019) 112088.

* cited by examiner

*Primary Examiner* — Terressa Boykin
(74) *Attorney, Agent, or Firm* — Frank Rosenberg

(57) ABSTRACT

The invention comprises methods of robotically separating unwanted heteroatom-containing materials from a plastic mixture and catalytically pyrolyzing the resulting mixed plastics to obtain olefins and aromatics. Systems and compositions useful in the catalytic pyrolysis of plastics are also described.

20 Claims, 2 Drawing Sheets

ROBOTIC SEPARATION OF PLASTICS FOR CHEMICAL RECYCLING

RELATED APPLICATIONS

This application claims the priority benefit of U.S. Provisional Patent Application No. 63/125,282 filed 14 Dec. 2020.

FIELD OF THE INVENTION

This invention relates to the combination of a mechanical robotic sorting system that identifies and removes specific materials such as PVC from a mixed stream such as waste plastics or MSW, and the chemical conversion of the remaining waste plastics, polymers, and other waste materials, to useful chemical and fuel products such as paraffins, olefins, and BTX.

INTRODUCTION

In 2018, plastics generation in the United States was 38.5 million tons, which was 13.1 percent of MSW generation. World-wide over 350 million tons of plastics were produced. Plastic recycling recovers scrap or waste plastic and reprocesses the material into useful products. However, since China and other countries banned the import of waste plastics the recycle rate in the US is estimated to have dropped to only 4.4%.

Plastic recycling is challenging because of the chemical nature of the long chain organic polymers and low economic returns. In addition, waste plastic materials often comprise a mixture of various plastic resin types, e.g. low density polyethylene (LDPE), high density polyethylene (HDPE), polypropylene (PP), polystyrene (PS), polycarbonate (PC), polyvinyl chloride (PVC), polyethylene-terephthalate (PET), and others. PVC contributes about 12% of the total production of plastics.

Terminology for plastics recycling is complex and sometimes confusing because of the wide range of recycling and recovery activities. These include four categories: primary (mechanical reprocessing into a product with equivalent properties), secondary (mechanical reprocessing into products requiring lower properties), tertiary (recovery of chemical constituents), and quaternary (recovery of energy).

Primary recycling is often referred to as closed-loop recycling, and secondary recycling as downgrading. Tertiary recycling is either described as chemical or feedstock recycling and applies when the polymer is de-polymerized to its chemical constituents. Quaternary recycling is energy recovery, energy from waste, or valorization. Biodegradable plastics can also be composted, and this is a further example of tertiary recycling, and is also described as organic or biological recycling.

Primary recycling, i.e. reusing the waste as a plastic material in similar applications, provides the highest value to waste plastics, but requires elaborate collection, separation, and purification schemes. Mechanical separation can be used to recover various fractions for secondary recycling processes such as melting/recasting. Many plastics contain additives and/or fillers such as antioxidants, heat and light stabilizers, plasticizers, impact resistance enhancers, pigments and pigment carriers, flame retardants, mold-release agents, and foaming agents. Secondary recycling by melting and recasting of materials containing additives results in the loss of mechanical properties, thus restricting recycling to simpler applications such as replacing low-grade wood, as in park benches. Secondary recycling of mixed plastics often must be conducted at the melting temperature of the highest melting component which can lead to overheating and degradation of some lower melting components, which in turn reduces the final properties. Mechanical recycling of mixed polymers ultimately always leads to the formation of polymer blends that have miscibility problems and whose composition varies as the mix of polymers in the feed changes. Producing energy in quaternary recycling involves combusting the plastics, an inherently unsustainable process. Theoretically, waste plastics have excellent fuel value, quite comparable to that of gas oil, when only polyolefins are considered. The presence of hetero-atoms, such as oxygen, nitrogen, or chlorine, reduces the heating value. Chlorine acts as an inhibitor and generates strongly acid gas. In practice plastics are difficult to burn because of an almost uncontrollable combustion rate, leading to local oxygen deficiency and products of incomplete combustion, including potential toxins.

Chemical Recycling

Tertiary, or chemical, recycling has great potential for use with heterogeneous and contaminated plastic waste material where clean separation of individual types of plastics is neither economical nor completely technically feasible. Chemical recycling by pyrolytic depolymerization has the advantage of recovering the chemical constituents of the polymer(s), which can then be used to re-manufacture plastic or to make other chemicals. Chemical recycling based on thermal and catalytic breakdown of polymers yields monomers, oil fractions, aromatic fractions, synthetic crude, and synthesis gas. Pyrolysis is a flexible technology for plastic waste feeds that are difficult to depolymerize and that are currently not (mechanically) recycled but incinerated and/or dumped in landfills such as mixed PE/PP/PS, multilayer packaging (some of which include metallic film layers), fiber-reinforced composites, polyurethanes, and construction and demolition wastes. Unlike mechanical recycling, chemical recycling can handle highly contaminated feedstock, such as automotive shredder residue, and highly heterogeneous mixtures of plastics increasing the flexibility of the process with respect to feedstock. Chemical recycling is sustainable as it also reduces the amount of new chemicals needed for the production of fuels and virgin plastics. PVC is not recovered in municipal industrial separation and classification plants (also known as material recovery facilities, or MRFs) and PVC contains more additive volume than any other resin.

The presence of additives, as well as chemicals used in initiating or terminating polymerization, is a complicating factor in chemical recycling of waste plastics, since their nature, amount, and behavior during pyrolysis or catalytic pyrolysis (thermal volatilization or breakdown), and eventual influence upon reaction products and mechanism are somewhat unpredictable, especially for waste plastics of unknown origin and formulation. The major heteroatoms appearing in polymers are: oxygen, nitrogen, chlorine, bromine, fluorine. After plastics pyrolysis, these elements either appear as intermediate organic compounds still incorporating the heteroatoms, or as stable inorganic compounds, i.e. water, ammonia and hydrogen cyanide, hydrogen chloride, hydrogen bromide and bromine, and hydrogen fluoride. Most of these are hazardous and corrosive and require a careful selection of construction materials, as well as methods to neutralize or inhibit their effect. For catalytic pyrolysis the heteroatoms can inhibit catalyst function by poisoning the catalyst, or can cause degradation or decomposition of the catalyst, or both.

In chemical recycling processes of mixed plastics, PVC is the most common polymer that includes a heteroatom, and its decomposition produces hydrochloric acid vapor and chlorinated compounds that are detrimental to the pyrolysis yield and can cause corrosion, thus requiring expensive metallurgy. Chlorinated compounds formed by PVC pyrolysis are deleterious to refinery processing and proscribe their use as fuels. Degradation of PVC that contains additives releases phtalate plasticizers and chlorine-containing organics (e.g. dioxins). Even small quantities of PVC, upon degradation, can contaminate entire batches of polymers in recycling plants and corrode reactors, valves, and transport lines.

Thus, there are strong environmental and economic incentives to remove PVC, PVDC, and other heteroatom containing materials from mixed plastics before attempting chemical recycling of mixed waste plastics.

Combination with Plas-TCat

Bio-TCat™ is the catalytic pyrolysis technology to convert renewable bio-mass materials to a mixed product of permanent gases, C2-C4 light olefins, C1-C4 light paraffins, and C5+ hydrocarbons including benzene, toluene, and xylenes ("BTX"), aromatic and non-aromatic naphtha range molecules, C11+ hydrocarbons, coke and char, and minor byproducts. Conversion occurs in a fluid bed reactor using ZSM-5 zeolite or similar catalyst. A portion of the light gases produced by the reaction may be recycled to the reactor to provide fluidization gas and for biomass feedstock injection into the vessel. Coke and char by-products that accumulate on the catalyst and temporarily deactivate it are removed by oxidation in a continuously operating catalyst regenerator. Waste materials which can be processed by Bio-TCat include biomass, waste tires, lubricating oils, coal, and petroleum residues.

A new technology is Plas-TCat™ which is also a catalytic fluid bed process using zeolite catalysts, but the feedstock is polymer/plastic material, especially waste plastics that otherwise might be sent to a landfill or incinerator. Plastic mixtures that have relatively high hydrogen to carbon molar ratio and exclude chlorine and nitrogen, such as polyethylene (PE), polypropylene, polystyrene, and combinations can be converted to olefins and aromatics in the Plas-TCat process. The HCl liberated by PVC or PVDC pyrolysis interferes with Plas-TCat processing by causing the decomposition of catalysts in addition to causing corrosion. Removal of PVC and PVDC from a waste plastic mixture is thus highly advantageous for chemical recycling.

Conventional Sorting and Separation of PVC

Sorting of co-mingled rigid recyclables occurs by both automatic and manual methods. Automated presorting is usually sufficient to result in a plastics stream separate from glass, metals, multi-layer packaging, and paper (other than when attached, e.g. as labels and closures), that nevertheless contains a variety of plastics.

Automatic sorting of plastic containers is now widely used by material recovery facility operators and also by many plastic recycling facilities. These systems generally use Fourier-transform near-infrared (FT-NIR) spectroscopy for polymer type analysis and also use optical color recognition camera systems to sort the streams into clear and colored fractions. Sorting performance can be maximized using multiple detectors, and sorting in series. Another sorting technology is X-ray fluorescence, which is used for identification of PVC containers, which are 59 percent chlorine by weight and so can be easily distinguished ("Recycling of polymeric materials used for food packaging: current status and perspectives," Arvanitoyannis, I. Bosnea, L., Food Rev. Int. 17, 2001 291-346; "Plastics recycling: challenges and Opportunities," J. Hopewell et al., Phil. Trans. R. Soc. B, 2009, 2115-2126).

Sink/float separation in water solutions can effectively separate lower density polyolefins (PP, HDPE, LDPE) from higher density polymers such as PVC, PET, PC (polycarbonate), and PS. Use of different media can allow separation of PS from PET, but PVC cannot be removed from PET in this manner as their density ranges overlap. Furthermore, this method separates other plastics which have value in the plastics upgrading, such as PC and PS (which both have specific gravities that are higher than water). Other separation techniques such as air elutriation can also be used for removing low-density films from denser ground plastics. Technologies for separation of PVC contaminants from PET flake include froth flotation, FT-NIR or Raman emission spectroscopic detection to enable flake ejection, and the use of electrostatic properties. For PET/PVC flake mixtures, thermal kilns can be used to selectively degrade minor amounts of PVC impurities, as PVC turns black on heating, enabling color-sorting. Conventional technologies such as sink/float, air elutriation, froth flotation, and others for separating PVC and PVDC are expensive, complex, slow, and ineffective for materials that have not been reduced in size to small flakes.

Literature references show some dechlorination of a PVC containing mixture by the use of stepwise pyrolysis with an additional low temperature step (e.g. 300° C. for 60 min) in order to remove Cl as HCl, which evolves as gas. About 80% of the Cl is removed as HCl, leaving about 20% of the Cl still bound to the polymers in the mixture. The partially dechlorinated mixture can then be depolymerized in a catalytic pyrolysis process. Some materials, usually alkaline adsorbents like CaCO3, CaO, Ca(OH)2, Na2CO3, or NaHCO3, can be added to the process as chloride scavengers and HCl formation inhibitors to remove chloride before or during pyrolysis; the Ca-containing salts formed are then washed away. However, the addition of chloride scavengers causes problems due to reactor clogging by the CaCl2 or NaCl formed and because the salts formed become mixed with the catalyst and cannot be completely removed. Removal of halogenated materials from the starting material is preferred, as these last techniques lead to additional waste streams that need to be processed, increasing the complexity and operating cost of the plant.

Another scheme for removing the chlorine from a pyrolysis process involves the co-pyrolysis of the PVC-containing plastic mixture with a nitrogen-rich material, such as manure, as described in "Tertiary recycling of PVC-containing plastic waste by copyrolysis with cattle manure," Duangchang A, Samart C., Waste Manage, 2008; 28 2415-21. Reportedly the yields of liquid products are reduced and any unreacted nitrogen compounds can find their way into the product mixture where they are not wanted.

In a 2019 paper presented at the 14th Conference on The Sustainability of Plastic and its Alternatives (pp 43-55, SDEWES 2019, 1-6 Oct. 2019) in Dubrovnik entitled "A small contribution to the debate on the sustainability of plastic waste management," Daniel R. Schneider mentions the use of robotic separation to a plastic waste stream. No mention is made of combining robotic separations with advanced plastics upgrading technologies to produce aromatics and olefins.

Various aspects of sorting mixed solid waste are discussed in U.S. Pat. Nos. 5,134,291, 10,427,988, 10,688,544, US Published Patent Applications US 2019/0130560 and 2020/0129989, and European Patent 1554060B1. Removal of heteroatom materials from the feed of a catalytic pyrolysis process is described in U.S. Pat. Nos. 10,336,628, 10,703, 649. Catalytic pyrolysis of plastics has been described in U.S. Pat. No. 8,420,875, US Published Patent Application 20200362248.

Chemical recycling has great potential for valorizing plastic wastes if the heteroatom-containing materials can be removed from the feed. Thus, a process is needed that selectively and effectively removes PVC, PVDC, and other heteroatoms from a waste plastics mixture and processes the mixture by chemical recycling.

Solution

It is an object of the present invention to provide a system for chemically recycling mixed plastics using a mechanical robotic sorting system that identifies and removes specific heteroatom containing materials such as PVC from a mixed stream such as waste plastics or MSW, and the chemical conversion of the remaining waste plastics, polymers, and other waste materials, to useful chemical and fuel products such as paraffins, olefins, BTX, or syngas.

SUMMARY OF THE INVENTION

In one aspect, the invention provides a method of converting a mixture comprising plastics to olefins, or aromatics, or both, comprising: removing heteroatom containing materials from the feed mixture by use of a robotic mechanical system for removing materials; mechanically and/or thermally processing of the remaining mixture; feeding the mixture to a pyrolysis reactor; pyrolyzing the remaining feed mixture within the reactor in the presence of a catalyst under reaction conditions sufficient to produce a raw product mixture comprising one or more olefins, or one or more aromatics, or both.

In another aspect, the invention provides a method of converting a mixed feed of materials, comprising: providing a first stream comprising one or more polymers; separating heteroatom containing materials from the first stream by robotic mechanical separation to produce a separated second stream and a heteroatom containing stream; feeding the second stream of materials to a fluidized bed pyrolysis reactor comprising a catalyst; pyrolyzing the second stream in the reactor; transferring at least a portion of the used catalyst with coke to a regenerator where the coke is reacted with oxygen or air to form hot regenerated catalyst and returning at least a portion of the hot regenerated catalyst to the fluidized bed reactor wherein heat from the hot regenerated catalyst provides energy to the step of pyrolyzing.

In a further aspect, the invention provides a method of catalytically pyrolyzing a feed mixture comprising a mixture of polymers in a fluidized bed reactor wherein at least a portion of the heteroatom containing materials have been robotically mechanically separated from the feed and the amount of oxygen introduced into the process is at least enough such that combustion of feed materials or other components with the introduced oxygen increases the temperature of the reacting mixture by at least 25° C., or at least 100° C., or at least 200° C., or at least 300° C., or from 50° C. to 400° C., or from 100° C. to 400° C., or from 200° C. to 400° C.

In one aspect, PVC is robotically separated from a waste plastics mixture and the remaining mixture of polymers is converted in a fluid bed catalytic pyrolysis process to produce olefins, aromatics, coke, gases, and other byproducts.

In another aspect, the invention provides a method of processing plastics to olefins, aromatics, and paraffins, comprising: separating heteroatom containing materials from a polymer mixture using a robotic separation process, feeding the remaining mixture of polymers to a reactor, and pyrolyzing the material within the reactor in the presence of a catalyst under reaction conditions sufficient to produce a gaseous raw product mixture comprising one or more olefins or aromatics.

In another aspect, the invention provides a method of catalytically pyrolyzing a mixed feed of materials, comprising: providing a first stream comprising a polymer or mixture of polymers; separating PVC or PVDC or other heteroatom containing materials from the first stream by robotic separation to produce a separated second stream and an impurity containing stream; adding the second stream of materials to a fluidized bed reactor; pyrolyzing the mixed feed in the presence of a solid catalyst in the fluidized bed reactor to produce a fluid product stream and used catalyst with coke, and wherein at least 95% of the carbon in the mixed feed is converted to coke and volatile products; transferring at least a portion of the used catalyst with coke to a regenerator where the coke is reacted with oxygen to form hot regenerated catalyst and returning at least a portion of the hot regenerated catalyst to the fluidized bed reactor wherein heat from the hot regenerated catalyst provides energy to the step of pyrolyzing.

The methods can be further characterized by one or any combination of the following features: where a plurality of the olefins is produced and the olefins are separated from the gaseous raw product mixture for subsequent conversion in another process; wherein the polymer or mixture of polymers is molten and further comprising filtering solids from the molten mixture prior to pyrolyzing; wherein the step of pyrolyzing comprises fast solid pyrolysis in the presence of a catalyst; wherein the catalyst comprises a zeolite; wherein the reaction is conducted in a fluidized bed, circulating bed, bubbling bed, or riser reactor at an operating temperature in the range from 300° C. to 1000° C., or from 400° C. to 650° C., or from 450° C. to 600° C., or from 500° C. to 575° C.; wherein the polymer or mixture of polymers comprises at least 80 mass % of polyethylene or polypropylene, or a combination of both; wherein the polymer or mixture of polymers comprises at least 80 mass % of PET or other polyesters; wherein the gaseous raw product mixture comprises at least 20 mass % olefins, or at least 50 mass % olefins, in some embodiments in the range of 20 to 90 mass % olefins; wherein the mass yield of olefins is at least 30%, or at least 40%, or at least 45%, or at least 50%, or at least 55%, or at least 60%, or from 20% to 70%, or from 30% to 65%, or from 45% to 60%, based on the mass in the polymer feed; wherein the reactor is a fluidized bed reactor; wherein the catalyst is a solid catalyst and the step of pyrolyzing comprises pyrolyzing in the presence of the solid catalyst in a fluidized bed reactor to produce a fluid product stream and used catalyst with coke, and wherein at least 95% the carbon in the feed is converted to coke and volatile products; transferring at least a portion of the used catalyst with coke to a regenerator where the coke is reacted with oxygen to form hot regenerated catalyst and returning at least a portion of the hot regenerated catalyst to the fluidized bed reactor wherein heat from the hot regenerated catalyst provides energy to the step of pyrolyzing; wherein at least a portion of the gases in the product mixture are combusted in the regenerator; wherein the gaseous raw product mixture is subjected to a separation process to produce a stream of gases enriched in CO and H2; and passing at least a portion of the stream of gases enriched in CO and H2 to the regenerator where they are combusted; wherein the polymer or mixture of polymers comprises polyethylene, or polypropylene, or polystyrene, or mixtures thereof;

In any of the methods of the invention, the materials to be removed comprise one or more heteroatoms selected from among oxygen, nitrogen, sulfur, chlorine, bromine, and iodine, or some combination of these; or heteroatoms comprising nitrogen, sulfur, chlorine, bromine, iodine, alkali or alkaline earth metals, and transition metals; or sulfur, chlorine, bromine, iodine, alkali or alkaline earth metals, and transition metals; or halogens.

In another aspect, or in any selected method, the invention provides a robotic mechanical separation comprising: identifying the objects to be removed from a waste feed mixture; gripping the objects to be removed with an articulated robotic arm; removing the objects identified to be removed; and processing the remaining materials in a pyrolysis or catalytic pyrolysis process.

The robotic mechanical separation may comprise: at least one robot arm provided with a gripping member; an artificial visualization system, one or more sensors, or both, allowing the localization of objects, and partial recognition of their nature; a processor for processing the information supplied by the vision system or by the one or more sensors, or both, and a controller for piloting the robotic arm for the selective removal of the objects comprising heteroatoms. The objects to be removed can be gripped mechanically by suction, compression, mechanical action, vacuum system, or some combination of these.

Any of the methods may comprise employing at least one sensor to identify the objects to be removed by recognizing their constituent material. The one or more sensors may detect objects using Fourier Transform Near Infra-Red (FT-NIR) spectroscopy, optical vision systems, or X-ray fluorescence. In any of the methods described herein, the materials can be granulated through extrusion and strand pelletization, or pulverization, or both.

In any of the methods, the stream comprising plastics can be a waste stream. The feed mixture materials can be selected from biomass, polyethylene (PE), polypropylene (PP), polyacetylene, polybutylene, polyolefins, polyethylene terephthalate (PET), polybutyleneterephthalate, copolyesters, polyester, polycarbonate, polyurethanes, polyamides, polystyrene (PS), polyacetal, epoxies, polycyanurates, polyacrylics, polyurea, vinyl esters, polyacrylonitrile, polyvinyl alcohol, polyvinylchloride (PVC), polyvinyl acetate, nylon, copolymers such as: ethylene-propylene, EPDM, acrylonitrile-butadiene-styrene (ABS), nitrile rubber, natural and synthetic rubber, tires, styrene-butadiene, styrene-acrylonitrile, styrene-isoprene, styrene-maleic anhydride, ethylene-vinylacetate, nylon 6, nylon 66, nylon 12, nylon 46, filled polymers, polymer composites, plastic alloys, other polymeric materials, and polymers or plastics dissolved in a solvent, whether obtained from polymer or plastic manufacturing processes as waste or discarded materials, post-consumer recycled polymer materials, materials separated from waste streams such as municipal solid waste, black liquor, wood waste, or other biologically produced materials, or some combination of these. In any of the methods, the feed mixture materials comprise PVC, or PVDC, or both PVC and PVDC. In any of the methods, the feed mixture materials may comprise multi-layer packaging that comprises one or more metallic components. In any of the methods, the polymer or mixture of polymers can be molten and further comprising filtering solids from the molten mixture prior to pyrolyzing. In any of the methods, the polymer or mixture of polymers may comprise at least 80 mass % of polyethylene or polypropylene, or a combination of both. In any of the methods, the polymer or mixture of polymers comprises at least 80 mass % of PET or other polyesters.

In any of the methods, the heteroatom containing materials may comprise PVC, or PVDC, or ABS, or PET, or some combination thereof. In any of the methods, the mechanical robotic separation can be conducted on the feed mixture conveyed on a belt conveyer. Characterization data obtained by the mechanical robotic separation unit can be collected, stored, and analyzed using artificial intelligence to enhance the accuracy of the separation process.

In any of the methods, olefins, or aromatics, or aromatics and olefins are recovered from the product stream. At least a portion of the product gases can be combusted in the catalyst regeneration unit. In any of the methods, the catalytic pyrolysis can be conducted in a fluidized bed, circulating bed, bubbling bed, or riser reactor at an operating temperature in the range from 300° C. to 800° C., or from 350° C. to 700° C., or from 400° C. to 650° C., or from 450° C. to 625° C., or from 500° C. to 600° C. In any of the pyrolysis methods, a stream enriched in ethylene or propylene, or both, can be separated from the volatile products and at least partially recycled to the pyrolysis reactor. In any of the methods, the step of pyrolyzing preferably comprises fast pyrolysis in the presence of a catalyst.

The step of pyrolyzing may comprise a zeolite catalyst; for example, the step of pyrolyzing may comprise a catalyst selected from among naturally occurring zeolites, synthetic zeolites, or combinations thereof; or wherein the step of pyrolyzing comprises a catalyst selected from among ZSM-5, ferrierite, zeolite Y, zeolite beta, mordenite, MCM-22, ZSM-23, ZSM-57, SUZ-4, EU-1, ZSM-11, SAPO-31, or SSZ-23, or some combination thereof; or wherein the step of pyrolyzing comprises a catalyst that includes ZSM-5 that contains H+ cations; or wherein the step of pyrolyzing comprise a zeolite catalyst with a constraint index within the range of 1 to 12. In any of the methods, the step of pyrolyzing may comprise a catalyst containing acidic sites. In any of the methods, the step of pyrolyzing comprises a catalyst comprising a metal or a metal oxide or both, wherein the metal is selected from among nickel, palladium, platinum, titanium, vanadium, chromium, manganese, iron, cobalt, zinc, copper, gallium, the rare earth elements, i.e., elements 57-71, cerium, or zirconium, or some combination thereof.

In any of the methods, the reactor can be a fluidized bed reactor; wherein the catalyst is a solid catalyst and the step of pyrolyzing comprises pyrolyzing in the presence of the solid catalyst in a fluidized bed reactor to produce a fluid product stream and used catalyst with coke, and wherein at least 95% the carbon in the feed is converted to coke and volatile products; transferring at least a portion of the used catalyst with coke to a regenerator where the coke is reacted with oxygen to form hot regenerated catalyst and returning at least a portion of the hot regenerated catalyst to the fluidized bed reactor wherein heat from the hot regenerated catalyst provides energy to the step of pyrolyzing.

In any of the methods, the step of pyrolyzing may comprise fast pyrolysis in the presence of a fluid bed catalyst. The pyrolysis reactor may comprise a fluidized bed, circulating bed, bubbling bed, or riser reactor operating at a temperature in the range from 300° C. to 800° C., or from 350° C. to 700° C., or from 400° C. to 650° C., or from 450° C. to 625° C., or from 500° C. to 600° C.

In any of the methods, the volatile products may comprise at least 10 mass % olefins, or at least 20 mass % olefins, in some embodiments in the range of 5 to 90 mass % olefins. A stream comprising C5+ products can be separated from the volatile products.

In any of the methods, a stream enriched in benzene, toluene, xylenes, or some combination of these, can be separated from the volatile products. The mass yield of BTX can be at least 10%, or at least 20%, or at least 25%, or at least 30%, or at least 35%, or at least 40%, or from 10% to 70%, or from 20% to 65%, or from 25% to 60%, based on the mass of the polymer feed from which heteroatom containing materials have been removed.

In any of the methods, the mixed feed comprises from 5 to 98, or 5 to 90, or 20 to 70, or 20 to 90, or 40 to 90, or 40 to 60 mass % of PE, PP, PS or mixtures thereof. In any of the methods, a plurality of olefins is produced and the olefins are separated from the gaseous raw product mixture and converted to products in another process. In any of the methods, the gaseous raw product mixture may comprise at least 20 mass % olefins, or at least 50 mass % olefins, in some embodiments in the range of 20 to 90 mass % olefins. In any of the methods, the gaseous raw product mixture can be subjected to a separation process to produce a stream of gases enriched in CO and H2; and passing at least a portion of the stream of gases enriched in CO and H2 to the regenerator where they are combusted.

In any of the methods, an amount of oxygen can be introduced into the process stream that is from 0.6% to 10%, 0.6% to 8%, 1% to 6%, or from 2% to 4% by weight, or at least 0.5%, at least 2%, at least 4%, or at least 6% by weight of the mass of the second stream, from which heteroatom materials have been removed. In any of the methods, the oxygen is introduced by the addition of air or O2 preferably as a component of the fluidization fluid, or with the gas injected with the plastics, or by separate, direct injection into the fluidized bed, or some combination thereof.

In any of the methods, the feed mixture for a catalytic pyrolysis process may comprise from 3 to 99 wt %, or from 5 to 90 wt %, or from 10 to 75 wt %, or at least 50, or at least 70, or at least 80, or at least 90, or at least 95 wt % polymers, and less than 2%, or less than 1%, or less than 0.1%, or from 0.0001 to 1%, or from 0.001 to 0.5%, or from 0.01 to 0.1% by mass is the sum of the masses of heteroatom containing materials. In any of the methods, the feed mixture may comprise 3 to 99%, or at least 70, or at least 80, or at least 90, or at least 95 mass % polymers, and less than 2%, or less than 1%, or less than 0.1%, or from 0.0001 to 1%, or from 0.001 to 0.5%, or from 0.01 to 0.1% by mass is the sum of the masses of PVC and PVDC.

In any of the methods, the sum of the heteroatoms oxygen, nitrogen, sulfur, chlorine, bromine, and iodine can be no more than 0.5, or 0.3, or 0.1, or 0.05, or 0.01, or 0.005 wt %, or from 0.0001 to 0.5, or from 0.001 to 0.3, or from 0.005 to 0.1 wt % of the mixture; or the sum of the PVC, PVDC, metal-containing multi-layer packaging, and other heteroatom materials can be less than 10%, or less than 5%, or less than 3%, or less than 2%, or less than 1%, or less than 0.5%, or less than 0.2% by mass of the feed mixture.

In any of the methods, the feed mixture may comprise, in addition to polyethylene, or polypropylene, or polystyrene, or mixtures thereof, added materials such that at least 1%, or at least 2%, or at least 3%, or at least 4%, or at least 10%, or from 0.5% to 20%, or from 1% to 15%, or from 2% to 13%, by mass of the feed mixture comprises material or materials that produces more than 1%, or more than 2%, or more than 5%, or more than 10%, or more than 20%, or more than 40%, or from 5% to 40%, or from 10% to 25% by weight coke and char in the catalytic pyrolysis of the added material in a standard drop tube experiment.

In any of the methods, the feed mixture for a catalytic pyrolysis process the amount of PVC, PVDC, metal-containing multi-layer packaging, and other heteroatom materials removed is at least 75%, or at least 85%, or at least 90%, or at least 95%, or at least 99% by weight of the initial amount of these materials in the received feed mixture (waste stream).

In a further aspect, the invention provides a system for producing olefins, or aromatics, or olefins and aromatics comprising: a feed comprising one or more polymers; a robotic separation system that identifies and removes heteroatom containing materials; a catalyst; a pyrolysis reactor containing the catalyst in which the feed is pyrolyzed and catalytically converted; a catalyst regenerator; and a recovery system for recovering olefins, or aromatics, or olefins and aromatics from the product mixture. This system may include any of the features described above or anywhere in the specification. For example, the system may comprise a catalyst regenerator that regenerates at least a portion of the catalyst by oxidizing the catalyst to remove carbonaceous materials and return at least a portion of the regenerated catalyst to the pyrolysis reactor.

GLOSSARY

Figure 1:
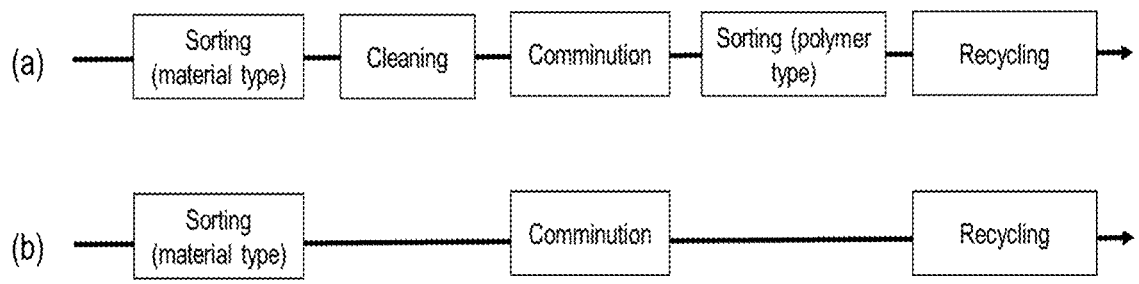
FIG. 1 compares (a) conventional processes for separating waste streams containing plastics with (b) the inventive process flow for separating waste streams containing plastics.

Aromatics—As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g. naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene, etc.), naphthalene, methyl-naphthalene (e.g., 1-methyl naphthalene, anthracene, 9,10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dymethyl-hydrindene. Single-ring and/or higher ring aromatics may also be produced in some embodiments.

Catalysts—Catalyst components useful in the context of this invention can be selected from any catalyst known in the art, or as would be understood by those skilled in the art. Catalysts promote and/or effect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, hydrogenation, polymerization, cyclization, desulfurization, denitrogenation, deoxygenation, aromatization, decarbonylation, decarboxylation, aldol condensation, and combinations thereof. Catalyst components can be considered acidic, neutral or basic, as would be understood by those skilled in the art.

For catalytic pyrolysis, particularly advantageous catalysts include those containing internal porosity selected according to pore size (e.g., mesoporous and pore sizes typically associated with zeolites), e.g., average pore sizes of less than about 100 Angstroms, less than about 50 Angstroms, less than about 20 Angstroms, less than about 10 Angstroms, less than about 5 Angstroms, or smaller. In some embodiments, catalysts with average pore sizes of from about 5 Angstroms to about 100 Angstroms may be used. In some embodiments, catalysts with average pore sizes of between about 5.5 Angstroms and about 6.5 Angstroms, or between about 5.9 Angstroms and about 6.3 Angstroms may be used. In some cases, catalysts with average pore sizes of between about 7 Angstroms and about 8 Angstroms, or between about 7.2 Angstroms and about 7.8 Angstroms may be used.

In some preferred embodiments of catalytic pyrolysis, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, mordenite, MCM-22, ZSM-23, ZSM-57, SUZ-4, EU-1, ZSM-11, SAPO-31, SSZ-23, among others. Zeolites and other small pore materials are often characterized by their Constraint Index. For the purposes of this invention, unless otherwise specified, the catalysts ZSM-5, ferrierite, zeolite Y, zeolite beta, mordenite, MCM-22, ZSM-23, ZSM-57, SUZ-4, EU-1, ZSM-11, SAPO-31, SSZ-23, and others, include the material in its acid form where the cations have been exchanged for H+ ions, or in its native (as prepared) form comprising organic cations such as ammonium, substituted ammonium, or similar nitrogen containing cations, or in a form comprising metal cations such as alkali or alkaline earth metal cations, or some combination of these. The catalyst ZSM-5 in its acid form, i.e. wherein at least a portion of the cations in the structure are H+ cations, is preferred.

A simple determination of the Constraint Index may be made by passing continuously a mixture of an equal weight of normal hexane and 3-methylpentane over a small sample, approximately 1 gram or less, of crystalline material at atmospheric pressure according to the following procedure. The sample of the crystalline material, in the form of pellets or extrudate, is crushed to a particle size about that of coarse sand and mounted in a glass tube. Prior to testing, the crystalline material is treated with a stream of air at 537° C. for at least 15 minutes. The crystalline material is then flushed with helium and the temperature adjusted between 287° C. and 510° C. or higher to allow an overall conversion of between 10% and 60% when the mixture of hydrocarbons is passed at 1 liquid hourly space velocity (i.e., 1 volume of liquid hydrocarbon per volume of crystalline material per hour) over the crystalline material with a helium dilution to give a helium to total hydrocarbon mole ratio of 4:1. After 20 minutes on stream, a sample of the effluent is analyzed, most conveniently by gas chromatography, to determine the fraction remaining unchanged for each of the two hydrocarbons. The Constraint Index is the ratio of the log of the n-hexane remaining divided by the log of the 3-methylpentane remaining. The Constraint Index approximates the ratio of the cracking rate constants for the two hydrocarbons. The method by which Constraint Index is determined is described more fully in U.S. Pat. No. 4,029,716, incorporated by reference for details of the method.

TABLE 1

Constraint Indices of some common zeolites.

| Material | Constraint Index | Test Temp, ° C. |
|---|---|---|
| ZSM-4 | 0.5 | 316 |
| ZSM-5 | 6-8.3 | 371-316 |
| ZSM-11 | 5-8.7 | 371-316 |
| ZSM-12 | 2.3 | 316 |
| ZSM-20 | 0.5 | 371 |
| ZSM-22 | 7.3 | 427 |
| ZSM-23 | 9.1 | 427 |
| ZSM-34 | 50 | 371 |
| ZSM-35 | 4.5 | 454 |
| ZSM-48 | 3.5 | 538 |
| ZSM-50 | 2.1 | 427 |
| Mordenite | 0.5 | 316 |
| REY | 0.4 | 316 |
| Dealuminized Y | 0.5 | 510 |
| Beta | 0.6-2 | 316-399 |

CI values typically characterize the specified crystalline material, but are the cumulative result of several variables useful in the determination and calculation thereof. Thus, for a given crystal exhibiting a CI value within the range of 1 to 12, depending on the temperature employed during the test method, with accompanying conversion between 10 and 60%, the CI may vary within the indicated range of 1 to 12. Likewise, other variables such as crystal size or the presence of possibly occluded contaminants and binders intimately combined with the crystal may affect the CI. It is understood to those skilled in the art that the CI, as utilized herein, while affording a highly useful means for characterizing the molecular sieves of interest is approximate, taking into consideration the manner of its determination, with the possibility, in some instances, of compounding variable extremes. However, in all instances, at a temperature within the above-specified range, the CI will have a value for any given molecular sieve useful herein within the approximate range of 1 to 12.

In other embodiments, non-zeolite catalysts may be used; for example, WOx/ZrO2, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Fluid—The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably. In some embodiments, it may be advantageous to control the residence time of the fluidization fluid in the reactor. The fluidization residence time of the fluidization fluid is defined as the volume of the reactor divided by the volumetric flow rate of the fluidization fluid under process conditions of temperature and pressure.

Fluidized Bed Reactor—The term "fluidized bed reactor" is given its conventional meaning in the art and is used to refer to reactors comprising a vessel that can contain a granular solid material (e.g., silica particles, catalyst particles, etc.), in which a fluid (e.g., a gas or a liquid) is passed through the granular solid material at velocities sufficiently high as to suspend the solid material and cause it to behave as though it were a fluid. Examples of fluidized bed reactors are described in Kirk-Othmer Encyclopedia of Chemical Technology (online), Vol. 11, Hoboken, N.J.: Wiley-Interscience, 2001, pages 791-825, incorporated herein by reference. The term "circulating fluidized bed reactor" is also given its conventional meaning in the art and is used to refer to fluidized bed reactors in which the granular solid material is passed out of the reactor, circulated through a line in fluid communication with the reactor, and recycled back into the reactor. Examples of circulating fluidized bed reactors are described in Kirk-Othmer Encyclopedia of Chemical Technology (Online), Vol. 11, Hoboken, N.J.: Wiley-Interscience, 2001, pages 791-825.

Bubbling fluidized bed reactors and turbulent fluidized bed reactors are also known to those skilled in the art. In bubbling fluidized bed reactors, the fluid stream used to fluidize the granular solid material is operated at a sufficiently low flow rate such that bubbles and voids are observed within the volume of the fluidized bed during operation. In turbulent fluidized bed reactors, the flow rate of the fluidizing stream is higher than that employed in a bubbling fluidized bed reactor, and hence, bubbles and voids are not observed within the volume of the fluidized bed during operation. Examples of bubbling and turbulent fluidized bed reactors are described in Kirk-Othmer Encyclopedia of Chemical Technology (online), Vol. 11, Hoboken, N.J.: Wiley-Interscience, c2001-, pages 791-825, incorporated herein by reference.

Heteroatoms—the term "heteroatoms" in the present context includes all elements that are not hydrogen or carbon. Specific heteroatoms addressed in this invention include oxygen, nitrogen, sulfur, chlorine, bromine, and iodine, but other heteroatoms such as alkali or alkaline earth metals, transition metals, or others are intended to be included in the heteroatoms to be removed from the feed mixture when they are a measurable portion of the feed materials. Whenever the term "heteroatoms" is used it includes preferred embodiments in which nitrogen, sulfur, chlorine, bromine, iodine, alkali or alkaline earth metals, and transition metals are removed; preferably sulfur, chlorine, bromine, iodine, alkali or alkaline earth metals, and transition metals; or sulfur, chlorine, bromine, iodine, alkali or alkaline earth metals, and transition metals are removed; or halogens are removed; or oxygen and sulfur are removed. The extent of selective removal is sufficient such that the level of the ratio of heteroatoms/waste mass is reduced by at least 5% or at least 10%, or at least 20%, or at least 30%, or at least 50%, or at least 70%, or at least 90%. Preferably, these ratios exclude water present in the system.

Olefins—The terms "olefin" or "olefin compound" (a.k.a. "alkenes") are given their ordinary meaning in the art, and are used to refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed-ring) or of an open-chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2 methyl propene), butadiene, and isoprene, among others. Examples of cyclic olefins include cyclopentene, cyclohexane, cycloheptene, among others. Aromatic compounds such as toluene are not considered olefins; however, olefins that include aromatic moieties are considered olefins, for example, benzyl acrylate or styrene.

Plastics or Polymers—The terms "plastics" and "polymers" are used interchangeably herein. A polymer is a carbon-based material chiefly made up of repeating units and having a number average molecular weight of at least 100, typically greater than 1000, or greater than 10,000.

Pyrolysis—The terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, $O_2$. Preferably, the volume fraction of $O_2$ present in a pyrolysis reaction chamber is 0.5% or less. Pyrolysis may take place with or without the use of a catalyst.

Catalytic pyrolysis refers to pyrolysis performed in the presence of a catalyst, and may involve steps as described in more detail below. Examples of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Yield—The term yield is used herein to refer to the amount of a product flowing out of a reactor divided by the amount of reactant flowing into the reactor, usually expressed as a percentage or fraction. Yields are often calculated on a mass basis, carbon basis, or on the basis of a particular feed component. Mass yield is the mass of a particular product divided by the weight of feed used to prepare that product. For example, if 500 grams of polymer is fed to a reactor and 45 grams of benzene is produced, the mass yield of benzene would be 45/500=9% benzene. Carbon yield is the mass of carbon found in a particular product divided by the mass of carbon in the feed to the reactor. For example, if 500 grams of polymer that contains 90% carbon is reacted to produce 400 grams of benzene that contains 92.3% carbon, the carbon yield is [(400*0.923)/(500*0.90)] =82.0%.

DETAILED DESCRIPTION

Municipal solid waste (MSW) or other waste mixtures that contain plastics frequently contain fractions of polyvinylchloride (PVC) or polyvinylidene dichloride (PVDC), or both. These materials, and other heteroatom-containing materials, present problems for chemical recycling of waste plastics or other materials since they release hydrochloric acid (HCl), chlorinated hydrocarbons, HCN, H2S, or other unwanted materials upon thermal decomposition. The HCl can cause corrosion of metal vessels that can be overcome at great expense by employing very expensive metals or alloys. Hydrochloric acid can destroy catalysts used in various upgrading processes as well. Organic products that contain chlorine are considered contaminants in fuels or chemical products and this severely limits their use. Sulfur or nitrogen containing materials can interact with a catalyst to reduce its activity. These effects of heteroatoms in the feed mixture dramatically raise the costs of chemical recycling and make it very unattractive economically. The present invention overcomes these limitations by providing a novel process for removing heteroatom-containing plastics such as PVC and PVDC, or other unwanted materials, from the feed mixture using robotic separation techniques and chemically converting the resulting mixture to useful chemical intermediates or monomers.

The mixture of feed materials used in the inventive process comprises waste plastics, polymers, or other materials, and halogenated polymers such as PVC, PVDC, and other materials that contain nitrogen, oxygen, or sulfur, or the like. MSW is a typical feed, as is the mixture of materials left when glass, or metal, or mineral matter such as rocks, stones, or pebbles have been removed from MSW, or a mixture of recycled plastics, although any mixed waste stream that contains heteroatom-containing polymers is within the scope of the invention.

Feed materials for the process comprise one or more of the following materials: polyethylene, polypropylene, polyacetylene, polybutylene, polyolefins, polyethylene terephthalate (PET), polybutyleneterephthalate, copolyesters, polyester, polycarbonate, polyurethanes, polyamides, polystyrene, polyacetal, epoxies, polycyanurates, polyacrylics, polyurea, vinyl esters, polyacrylonitrile, polyvinyl alcohol, polyvinylchloride (PVC), polyvinylidene dichloride (PVDC), polyvinyl acetate, nylon, copolymers such as: ethylene-propylene, EPDM, acrylonitrile-butadiene-styrene (ABS), nitrile rubber, natural and synthetic rubber, tires, styrene-butadiene, styrene-acrylonitrile, styrene-isoprene, styrene-maleic anhydride, ethylene-vinylacetate, nylon 66, • nylon 6, • nylon 12, • nylon 46, filled polymers, polymer composites, plastic alloys, and polymers or plastics dissolved in a solvent. The feed materials can comprise materials obtained from polymer or plastic manufacturing processes as waste or discarded materials, post-consumer recycled polymer materials, materials separated from waste streams such as municipal solid waste, black liquor, or wood waste. In some embodiments, the feed stream contains at least 80 or at least 90 or at least 95 mass percent of polyethylene or polypropylene, or a combination of both. In some embodiments, the feed stream contains at least 80 or at least 90 or at least 95 mass percent of PET or polyester, or a combination of both. In some embodiments, the process is surprisingly tolerant of impurities such as halogens, that would be more destructive in conventional processes.

In some embodiments, biomass or other coke-forming materials can be mixed or included with the plastics to aid in the formation of coke, to enable a greater energy generation in the regeneration of the catalyst and use of the hot regenerated catalyst to heat the process. Biomass could include paper from labels, cardboard, or other paper type products, in addition to the biomass feedstock utilized for the Bio-TCat process. The absence of significant coke formation with the pyrolysis of relatively pure polyolefin streams leads to the need to add heat to the regeneration of the catalyst. Ground tires can also be utilized for this purpose.

In some embodiments the mixture of components in the feed is adjusted to optimize the production of olefins, aromatics, or the sum of olefins and aromatics.

Scanning and Identification Systems

Typically, an array of items to be sorted is situated on a moving conveyer for identification and separation. The items are irradiated with radiation of one or more appropriate wavelengths or range of wavelengths such as visible light, UV (ultraviolet) light, NIR (near infrared), X-rays, or other, whose reflection, absorption, or emission is registered in one or more detectors. A detection system consists of three subsystems, namely an image analysis system, a scanning device, and one or more spectrometers tuned to a particular radiation frequency or wavelength, such as NIR, UV, or visible, etc, for the evaluation of the spectral absorption, emission, or reflection patterns. Preferably the detectors have the ability to evaluate the patterns with spatial resolution to provide an accurate indication of the material as a whole, rather than a single spot that could be an anomaly due to the bulk material being obscured by other materials such as labels, dirt, or debris. Additionally, an image that can be evaluated for size, shape, and contours can aid in identifying many items. Preferably the detection system provides simultaneous determination of spatially resolved image(s) and spectral data in real time so that objects that are in motion such as on a conveyer can be assessed accurately by integrating the spectral and image information for comparison to data bases of knowns on which the system has been trained, and prior samples. When objects are in motion multiple data packets are recorded sequentially for each item and combined into a multidimensional information space using computer software that can be evaluated to determine both the shape, size, and position of the objects to be classified and, simultaneously, color and/or other material properties, e.g. chemical composition. This makes it possible to precisely identify the objects to be separated, classify them in real time and then, for example, carry out a corresponding sorting. To aid in material distribution on belts, large format items, such as large sheets of plastic, may first be reduced in size to approximately 300 mm in their longest dimension. Such size reduction avoids problems with large format items covering other items which might be targets for removal. It also enables simpler material handling in that the large format items can often either be dragged back onto a moving conveyor belt, or can drag other items which may be valued plastics into the discard sortation.

AI

Artificial Intelligence (AI) technology works by perceiving images of materials moving on conveyor belts within recycling facilities. Looking for specific colors, shapes, contours, textures, logos, emissions, reflections, and more to recognize patterns correlated with material type, the AI platform learns to identify objects similar to the way a human does. The AI platform constructs a "model" of an object using simple building blocks like material features. The neural network is trained by showing it examples of items belonging to each material category, each new image contributing to the strength and effectiveness of the machine learning algorithms within an ever-expanding dataset.

AI-enabled systems tend to become "smarter" over time as they add new examples to their datasets. Sorting machines can be connected to the 'cloud' (off-site data storage systems) and will contribute to a shared pool of information. Systems have been installed which process as much as 850 tons per day of single stream waste material (recycled material that includes all types of recyclables, e.g. paper, plastic, metal, etc. in a single stream) from households and businesses that can accurately recover a wide variety of plastics, paper, metal, wood and other materials.

Robotic Sorting

One embodiment of the inventive method which may be used for removal of heteroatom containing materials from waste plastics is automated mechanical sortation. Automated mechanical sortation utilizes independently either:

Articulated robotic arms with grippers (pinching, suction, or other mechanical means to "grab" and hold pieces of plastic) that can separate individual pieces of plastic from a moving conveyance or An automated system using another means of "pushing" the piece of plastic off of the conveyance, such as an automated pneumatic (compressed air nozzle manifold) system, vacuum system, or diversion gates that move, to push or pull the piece off of the conveyance, or similar devices.

These mechanical sortation systems utilize a computer system to drive actuators. The computer receives an input from a vision system utilizing Fourier Transform Near Infra-Red (FT-NIR) spectroscopy sensors, optical vision systems, or X-ray fluorescence, or other sensors, or some combination of a visualization system and one or more sensors, to locate the heteroatom containing items based on radiation received by one or more detectors. The hyperspectral sensors utilized for the automated sortation system can also provide spectral response for other undesirable items, such as metal foils, often found in multi-layer packaging which accompanies the feed stream. The computer system may also utilize artificial intelligence (AI) to "learn" so that the accuracy of the removal improves over time. The input from these sensors is used by the computer to identify the material and initiate the removal action (air puff or articulated robotic arm with gripper) for unwanted materials, e.g. PVC, PVDC, PET, ABS, nylon, or other heteroatom-containing materials.

A representative robotic sorting station comprises: at least one articulating robot arm provided with a gripping member; an artificial vision system allowing the localization of objects and partial recognition of their nature; at least one complementary sensor making it possible to complete the identification of the objects by recognizing their constituent material; means for processing the information supplied by the vision system and by the complementary sensor and means allowing the piloting of the robotic arm ensuring the selective extraction of the objects and placement of them in an appropriate receptacle.

The use of robotics lowers costs, reduces manual labor, increases recycling efficiency, and increases the purity of recycled materials. The robotic arms can exceed human picking speed; a human can pick 50 to 60 pieces a minute off a conveyor while with robotics, the pick rate can range from 70 to 90 per minute. Future developments are likely to increase the robotic picking rate to higher rates.

FIG. 1 presents a comparison of a typical conventional process that is used to separate the polymers in waste streams (a), and an embodiment of the inventive process for separating polymers in waste streams (b). In the conventional process (FIG. 1) a crude separation of the materials is usually performed on a 'whole' waste stream that comprises glass, metal, wood, plastics, and mineral matter to separate the plastics. This is often a manual separation and can be the cause of both health problems and accidental injuries to personnel. The plastics are then subjected to cleaning to remove adventitious dirt and other contaminants and comminution. In some cases the comminution comes before the cleaning. The flakes of plastic that are produced in the comminution process are then separated in a second separation process, that is usually an automated sorting process to provide streams of different plastic material that can be processed further. This sorting process uses density separation, optical separation techniques, or others.

In the inventive process illustrated in FIG. 1, the initial sorting includes an automated robotic separation wherein a spectroscopic identification technique is used to identify the items of interest for removal, and a robot, usually a robot arm, is employed to grasp the unwanted objects and remove them. This process can be conducted on the whole waste stream to remove items like glass, metal, and minerals, and simultaneously remove unwanted plastic items like PVC, PVDC, multi-layer packaging, and other heteroatom containing materials, or it can be conducted on a stream from which at least partial removal of non-plastic materials has been performed. The now separated plastic stream, from which the unwanted materials have been removed, can optionally be cleaned further, if needed, and comminuted for conversion via chemical recycling processes such as catalytic pyrolysis. The inventive process comprises fewer steps and less human interaction so that it is less expensive and safer.

Figure 2:
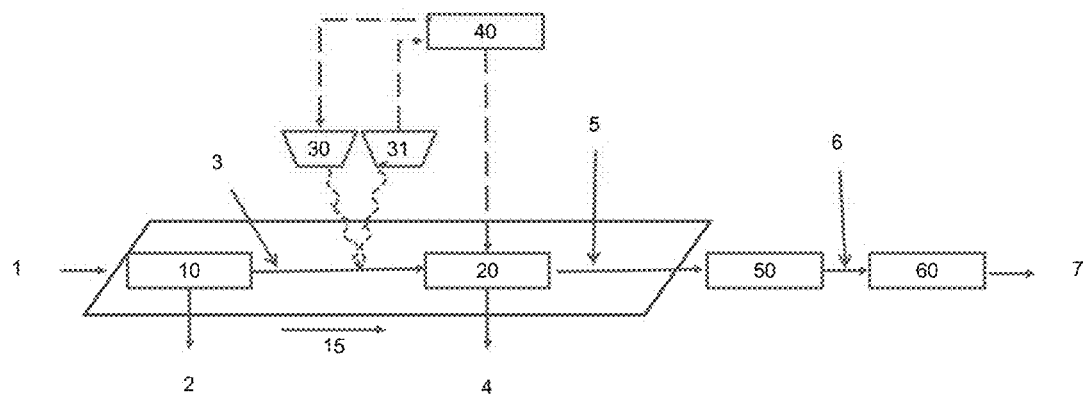
FIG. 2 presents a schematic of the chemical recycling process for identifying and separating halogenated plastics or other unwanted heteroatom containing materials and converting the remaining plastic mixture to useful products such as BTX and olefins.

FIG. 2 presents one embodiment of the inventive process. In FIG. 2, a waste stream 1 is delivered to the facility and dispersed on a conveyer belt, 15. An optional preliminary separator, 10, can be used to remove items that are not capable of treatment by the process, 2, such as glass, metal, and mineral matter. The feed material, 3, continues on the moving conveyer where it is irradiated by one or more transmitters, 30, and the reflections or emissions are detected by one or more detectors, 31. The transmitters, 30, and detectors, 31, can be a single device or all can be separate units. The transmitter(s) 30, and detector(s), 31, are connected to a data handling and control system, 40, that controls the irradiation transmitter(s), 30, and evaluates data received from the detector(s), 31. The control system is equipped with an artificial intelligence capability that can develop 'models' of objects of different types and compositions from training on known objects and through experience evaluating waste mixtures; the system 'learns' how to quickly and accurately identify objects. The control system activates and instructs a robotic 'picker', 20, that is equipped to grasp an object that has been identified as undesirable, such as containing PVC or PVDC, and moving it to a separate receptacle, 4. The separated feed stream, 5, that has had the undesirable materials removed is passed to a pretreatment facility, 50, that can clean the material of impurities such as metals or dirt or other impurities, and can comminute the material to the desired size range for processing. The pretreated plastics containing stream serves as the feed to a catalytic pyrolysis upgrading process, 60, that decomposes the material and converts it to a mixture of desirable products, 7, such as aromatics (BTX) and olefins.

The process for identifying, classifying, and sorting plastics can therefore be carried out simply, since geometrical and spectral data, for example relating to color and/or chemical composition, for each item, is measured and recorded simultaneously in real time and with high spatial and spectral resolution. The feed mixture provided to the chemical recycling process is thus assured of being substantially free of unwanted materials, such as PVC and PVDC or other heteroatom containing materials.

DESCRIPTION OF SOME PREFERRED EMBODIMENTS

The various features, characteristics, embodiments, etc. that are described herein are not limited to a single aspect or embodiment and should be understood as applicable to any of the inventive aspects described herein.

Feed Sizing

In most polymer chemical recycling schemes foreign materials such as glass, metals, and inorganics are removed from the plastic feed mixture and then the mixed plastic feed mixture is reduced in size before polymer separation is attempted. In the inventive process it is advantageous to separate the halogenated plastics and other heteroatom-containing materials as well as the foreign materials before the mixed plastics are reduced in size by comminution. Indeed, large size pieces of PVC or PVDC are more readily recognized by various sensing systems and fewer removal actions are needed to separate these undesirable materials, i.e. removal of one large PVC bottle eliminates a much larger amount of PVC than elimination of a single flake of shredded PVC. Robotic separation permits the separation of PVC or PVDC or other heteroatom-containing materials to be conducted using a plastics-containing feed mixture that has not been shredded or comminuted or is minimally processed, i.e. the mixture is handled using the same or similar size pieces as were received. Feed pieces fed to the mechanical separation step can be greater than 1 cm, or greater than 2 cm, or greater than 5 cm, or greater than 10 cm, or greater than 100 cm, or greater than 200 cm, or from 1 to 500 cm, or from 2 to 500 cm, or from 5 to 500 cm, or from 10 to 200 cm in their longest dimension while providing effective and selective separation of the undesirable materials. In some embodiments, a feed mixture for a catalytic pyrolysis process the amount of PVC, PVDC, metal-containing multi-layer packaging, and other heteroatom materials removed from the received feed is at least 75%, or at least 85%, or at least 90%, or at least 95%, or at least 99% by weight of the initial amount of these materials in the received feed mixture.

In some instances, the particle size of the solid polymer-containing feed composition after removal of undesirable materials may be reduced in a size reduction system prior to passing the feed to an upgrading process such as the catalytic pyrolysis reactor. In some embodiments, the average diameter of the reduced size feed composition exiting the size reduction system may comprise no more than about 50%, not more than about 25%, no more than about 10%, no more than about 5%, no more than about 2% of the mass averaged long dimension of the feed composition fed to the size reduction system. The feed mixture may comprise plastics mixtures in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm) screen or wherein the feed comprises plastics mixtures in which at least 85% by mass, or at least 90% by mass, or at least 95% by mass of the particles have aspect ratios (ratio of length to width) of 2:1, or 3:1, or 5:1, or 10:1, or 40:1, or 77:1, or from 1:1 to 100:1, or from 1.5:1 to 40:1, or from 2:1 to 10:1. Average diameter (size) can be measured by sieving through mesh (screen). Large-particle feed material may be more easily transportable and less difficult to process using a mechanical separation process than small-particle feed material. On the other hand, it may be advantageous to feed small particles to the reactor. The use of a size reduction system allows for the transport of large-particle feed between the source and the process, and identification and sorting of large particles, while enabling the feed of small particles to the reactor.

Embodiments of this invention include the various combinations of the preparation of the feed materials by removal of heteroatom containing materials as described above, with a process for converting the prepared feeds to valuable products such as olefins, or aromatics, or olefins and aromatics via a catalytic pyrolysis process as described below.

Catalytic Pyrolysis Description

A catalytic fast pyrolysis process for preparing chemicals or fuels from plastic materials comprises the steps of: i) separating and removing the heteroatom-containing feed materials from the feed, ii) feeding a plastics containing feed, catalyst composition, and transport fluid to a catalytic fast pyrolysis process fluidized bed reactor maintained at reaction conditions to manufacture a raw fluid product stream, iii) feeding the raw fluid product stream of step ii) to a solids separation and stripping system to produce separated solids and a fluid product stream, iv)

feeding the fluid product stream of step iii) to a quench vapor/liquid separation system utilizing water or hydrocarbon quench to produce a liquid phase stream comprising water, char, coke, ash, catalyst fines, oxygenates, and C9+ aromatics, and a vapor phase stream comprising carbon monoxide, carbon dioxide, hydrogen, olefins, and aromatics, said aromatics selected from the group consisting of benzene, toluene, xylenes, phenols, naphthols, benzofuran, ethylbenzene, styrene, naphthalene, methylnaphthalene and combinations thereof, v) feeding the vapor phase stream of step iv) to a condensation system to produce an organic phase stream, vi) hydrotreating the organic phase stream of step v) at hydrotreating conditions to produce a hydrotreated stream, vii) feeding the hydrotreated stream of step vi) to a separation and recovery system to recovery aromatics, olefins, or aromatics and olefins.

A gaseous product stream from the catalytic pyrolysis process can be separated into an olefin poor stream and an olefin rich stream and at least a portion of the olefin rich stream coming from an olefins separator purified before being converted to high value products.

In some embodiments, the gaseous raw product mixture (the vapor phase product leaving the fluidized bed reactor prior to any separation steps that occur outside the reactor) produced by the method comprises at least 20 mass % olefins, or at least 50 mass % olefins, in some embodiments in the range of 20 to 90 mass % olefins. In some embodiments the mass yield of olefins is at least 30%, or at least 40%, or at least 45%, or at least 50%, or at least 55%, or at least 60%, or from 20% to 90%, or from 30% to 75%, or from 45% to 60%, based on the mass of plastics in the feed.

The process may produce a BTX mixture upon separation of the products. In some embodiments the mass yield of BTX is at least 10%, or at least 20%, or at least 25%, or at least 30%, or at least 35%, or at least 40%, or from 10% to 70%, or from 20% to 65%, or from 25% to 60%, based on the mass of plastics in the feed.

In some embodiments, the feed composition comprises a mixture of polymeric material and a catalyst. The mixture may comprise, for example, solids, liquids, and/or gases. In certain embodiments, the mixture comprises a composition of a solid catalyst and a solid polymeric material. In other embodiments, a catalyst may be provided separately from the polymer feed stream. In other embodiments the feed mixture may comprise a molten stream of materials comprising plastics.

In processes in which catalyst from the catalytic pyrolysis is regenerated, heat is generated by the oxidation of coke, char, and other materials in a catalyst regenerator for use in the process, or for conversion to electricity for export. In one set of embodiments, an oxidizing agent is fed to the regenerator via a stream of air or other oxygen containing gas. The oxidizing agent may originate from any source including, for example, a tank of oxygen, atmospheric air, steam, among others. In the regenerator, the catalyst is re-activated by reacting the catalyst with the oxidizing agent and heat is generated. A solid mixture comprising deactivated catalyst may comprise residual carbon and/or coke as well as coke or char from the process, which may be removed via reaction with the oxidizing agent in the regenerator. In some embodiments a portion of the gaseous products from the catalytic pyrolysis process is fed to the catalyst regenerator to be combusted with the solid materials. The gaseous products may be first separated into an olefin rich stream and an olefin poor stream and at least a portion of the olefin poor stream is fed to the catalyst regenerator.

The process of the present invention comprises supplying the feed mixture of plastics and other materials from which heteroatom materials have been removed to a Plas-TCat™ fluidized bed catalytic pyrolysis reactor where it is reacted to form a vapor product stream and a solid catalyst containing stream. The catalyst containing stream is passed to a catalyst regenerator in which it is contacted with an oxidizing gas such as air to regenerate the catalyst and produce energy from the combustion. Energy for use in the process, e.g., for heating feed materials or recycle gases or other purposes, may be recovered from the hot combustion gases produced in the regenerator, by heat exchange in one or more heat exchangers. The vapor product stream from the catalytic pyrolysis is separated into valuable product streams containing olefins and aromatics, and a byproduct stream containing methane, ethane, propane, H2, CO2, and CO. Optionally a portion of the byproduct gas stream can be passed to the regenerator to increase the heat generation therein. A portion of the energy generated in the catalyst regenerator can be used as thermal energy in the catalytic pyrolysis reactor, or for products separation, or both, or the energy can be converted to electrical energy, or the generated energy can be used as thermal energy and electrical energy within the plant or exported. At least a portion of the regenerated catalyst is returned to the catalytic pyrolysis reactor.

The regenerated catalyst may exit the regenerator and may be recycled back to the catalytic pyrolysis reactor via a recycle stream. In some cases, catalyst may be lost from the system during operation. In some such and other cases, additional "makeup" catalyst may be added to the system via a makeup stream. The regenerated and makeup catalyst may be fed to the reactor with the fluidization fluid via a recycle stream, although in other embodiments, the catalyst and fluidization fluid may be fed to the reactor via separate streams.

The olefins can be separated from the product mixture of polymer conversion and at least a portion recycled to the catalytic pyrolysis, or upgraded to BTX in a separate process. Unconverted olefins from the olefins to aromatics step may be recycled to the olefins to aromatics process or to the catalytic pyrolysis.

In one embodiment of the process olefins are separated from the catalytic pyrolysis products and at least a portion of the olefins are recycled to the catalytic pyrolysis (Plas-TCat) reactor. This configuration of the inventive process takes advantage of the capability of the Plas-TCat process to convert olefins to aromatics, boosting the yield of aromatics obtained from the Plas-TCat reactor, and improving the efficiency of the overall process. In this embodiment of the invention the products of the Plas-TCat and olefins to aromatics processes may be handled separately or combined for purification and separation into the desired high value products.

In some embodiments the feed mixture comprises, in addition to polyethylene, or polypropylene, or polystyrene, or mixtures thereof, added materials such that at least 1%, or at least 2%, or at least 3%, or at least 4%, or at least 10%, or from 0.5% to 20%, or from 1% to 15%, or from 2% to 13%, by mass of the feed mixture comprises material or materials that produces more than 1%, or more than 2%, or more than 5%, or more than 10%, or more than 20%, or more than 40%, or from 5% to 40%, or from 10% to 25% by weight coke and char in the catalytic pyrolysis of the added material in a standard drop tube experiment.

In some embodiments, it may be advantageous to feed the polymers at least in part as a molten material. This can be done with polymers or plastics alone or as mixtures of polymers and plastics that melt at temperatures below 200° C. In some embodiments the molten polymers may be atomized before entrance into the pyrolysis reactor. This can be done with a carrier gas input or gas mixture recycled from the pyrolysis product separation section. Gas mixtures can comprise argon, helium, nitrogen, carbon dioxide, carbon monoxide, hydrogen, methane, ethane, propane, ethylene, or propylene, or recycle streams, or mixtures of these.

In some embodiments the molten mixture of polymers, or plastics, or polymers and plastics may be filtered to remove solids that do not readily melt at the chosen process conditions using any of the variety of filtering procedures known to those skilled in the art. In some embodiments in which the molten mixture of polymers, or plastics, or polymers and plastics, comprises materials that contain carbonaceous solids, these solids may be separated by hot filtration and optionally combusted to provide energy for the process.

The catalytic pyrolysis reactor used may be any suitable reactor known to those skilled in the art. For example, in some instances, the reactor may comprise a continuous stirred tank reactor (CSTR), a batch reactor, a semi-batch reactor, a fluidized bed reactor, or a fixed bed catalytic reactor, among others. In some cases, the reactor comprises a fluidized bed reactor, e.g., a circulating fluidized bed reactor, a moving bed reactor such as a riser reactor, or a bubbling bed reactor. Fluidized bed reactors may, in some cases, provide improved mixing of the catalyst and/or polymeric material during pyrolysis and/or subsequent reactions, which may lead to enhanced control over the reaction products formed. The use of fluidized bed reactors may also lead to improved heat transfer within the reactor. In addition, improved mixing in a fluidized bed reactor may lead to a reduction of the amount of coke adhered to the catalyst, resulting in reduced deactivation of the catalyst in some cases and higher yields of olefins and other desirable products. Throughout this specification, various compositions are referred to as process streams; however, it should be understood that the processes could also be conducted in batch mode.

In one set of embodiments separated catalyst may exit the catalytic pyrolysis reactor via a solids exit conduit. In some cases, the catalyst exiting the catalytic pyrolysis reactor may be at least partially deactivated. The separated catalyst may be fed, in some embodiments, to a regenerator in which any catalyst that was at least partially deactivated may be reactivated. In some embodiments, the regenerator may comprise an optional purge stream, which may be used to purge solids such as coke, ash, and/or catalyst from the regenerator.

In one set of embodiments, an oxidizing agent is fed to the regenerator via a gas feed stream. The oxidizing agent may originate from any source including, for example, a tank of oxygen, atmospheric air, recycled exhaust gas, or steam, among others. In the regenerator, the catalyst is re-activated by reacting the catalyst with the oxidizing agent. In some cases, the deactivated catalyst may comprise residual carbon and/or coke, which may be removed via reaction with the oxidizing agent in the regenerator. The regenerator comprises a vent stream which may include regeneration reaction products, residual oxidizing agent, etc. The exhaust gas vent stream from the regenerator may be passed through a catalytic exhaust gas cleanup system to further reduce the concentrations of CO and hydrocarbons to reduce emissions vented to the atmosphere. Portions of the exhaust gas vent stream may be recycled to the gas feed of the regenerator to control the heat release of the regeneration process.

The regenerator may be of any suitable size mentioned above in connection with the reactor or the solids separator. In addition, the regenerator may be operated at elevated temperatures in some cases (e.g., at least about 300° C., 400° C., 500° C., 600° C., 700° C., 800° C., or higher). The residence time of the catalyst in the regenerator may also be controlled using methods known by those skilled in the art, including those outlined above. In some instances, the mass flow rate of the catalyst through the regenerator will be coupled to the flow rate(s) in the reactor and/or solids separator in order to preserve the mass balance in the system.

The regenerated catalyst may exit the regenerator and be recycled back to the reactor via a catalyst recycle stream. In some cases, catalyst may be lost from the system during operation. In some cases, additional "makeup" catalyst may be added to the system via a makeup stream. The regenerated and makeup catalyst may be fed to the reactor with the fluidization fluid via a recycle stream, although in other embodiments, the catalyst and fluidization fluid may be fed to the reactor via separate streams.

The reaction products (e.g., fluid hydrocarbon products) may be fed to a solids separator where solid catalyst may be separated from the fluid products. The solids separation is preferably conducted in one or more cyclones.

In an embodiment of the invention, polymers or plastics or polymers and plastics from which heteroatom containing materials have been separated are fed to a catalytic pyrolysis reactor to form a gaseous product containing aromatic compounds and olefins, wherein the olefins are separated from the product, the olefins are purified and separated into the various component olefins, and each olefin stream is sent for further processing for conversion to useful products.

Since olefins are commonly produced, the invention is generally applicable to any polymer pyrolysis reaction. Preferably, the polymer feedstock comprises a solid material. The pyrolysis reactor comprises a solid catalyst for fast catalytic pyrolysis. The type of reactor and the type of solid catalyst (if present) are not limited, and can be generally of the type known for conversion of polymeric materials to fluid hydrocarbonaceous streams. Conditions for catalytic pyrolysis of polymers can be selected from any one or any combination of the following features (which are not intended to limit the broader aspects of the invention): a zeolite catalyst, a ZSM-5 catalyst; a microporous catalyst with constraint index between 1 and 12; a zeolite catalyst comprising one or more of the following metals: titanium, vanadium, chromium, manganese, iron, cobalt, nickel, copper, zinc, gallium, platinum, palladium, silver, phosphorus, sodium, potassium, magnesium, calcium, tungsten, zirconium, cerium, lanthanum, and combinations thereof; a fluidized bed, circulating bed, bubbling bed, or riser reactor; an operating temperature in the range from 300° C. to 1000° C., or from 400° C. to 650° C., or from 450° C. to 600° C., or from 500° C. to 575° C.; a solid catalyst-to-plastics-containing feed mass ratio of between 0.1 and 20 or between 0.5 and 15, or between 1 and 10, or between 3 and 8; the space velocity is in the range from 0.1 to 10 or from 0.2 to 8, or from 0.5 to 5, or from 1 to 4; the pressure is from 1 bara (actual bar) to 30 bara, or from 2 bara to 15 bara, or from 3 bara to 10 bara, or from 4 to 7 bara, or at least 3 bara, or at least 4 bara, or at least 6 bara; or a feed residence time from 0.1 to 120 seconds, or from 1 to 60 seconds, or from 5 to 30 seconds, or from 8 to 20 seconds, or less than 60 seconds, or less than 30 seconds, or less than 10 seconds, or less than 8 seconds, where feed residence time is calculated as the average time a carbon atom spends in the reactor at a temperature of at least 400° C. under actual conditions of temperature and pressure.

The pyrolysis process is normally conducted in an atmosphere with very low or zero oxygen (O2) concentration, usually less than 0.5% by volume. Nevertheless, in some embodiments the pyrolysis process can be conducted with concentrations of O2 of 0.6% by volume or greater in order to rapidly increase the temperature of the mixture to the desired reaction temperature, or to overcome the endothermic nature of the process, or both. In some embodiments the process feed is introduced at temperatures from 100° C. to 450° C., and the temperature can be very rapidly increased (changed) by at least 25° C., or at least 100° C., or at least 200° C., or at least 300° C., or from 100° C. to 400° C. by the use of small concentrations of $O_2$ in the process. The introduction of oxygen initiates combustion of hydrocarbons, CO, H2, or other components, or some combination, in the process to supply the needed thermal energy to achieve conversion of the feed materials. In these cases the concentration of $O_2$ in the feed to the reactor resulting from this addition could be from 0.6% to 10%, 0.6% to 8%, 1% to 6%, or from 2% to 4% by weight, or at least 0.6%, at least 2%, at least 4%, or at least 6% by weight, where the percent weight of $O_2$ is in comparison to the weight of the plastics-containing feed mixture, but in all cases the oxygen concentration introduced is kept below the concentration where significant unconverted oxygen may be found in the product mixture exiting the reactor. The oxygen is preferably introduced by the addition of air or $O_2$ as a component of the fluidization fluid, or with the gas injected with the plastics, or by separate, direct injection into the fluidized bed, or some combination thereof.

The molecular sieve for use herein or the catalyst composition comprising same may be thermally treated at high temperatures. This thermal treatment is generally performed by heating at a temperature of at least 370° C. for a least 1 minute and generally not longer than 20 hours (typically in an oxygen containing atmosphere, preferably air). While subatmospheric pressure can be employed for the thermal treatment, atmospheric pressure is desired for reasons of convenience. The thermal treatment can be performed at a temperature up to 925° C. The thermally treated product is particularly useful in the present process.

For the catalyst composition useful in this invention, the suitable molecular sieve may be employed in combination with a support or binder material such as, for example, a porous inorganic oxide support or a clay binder. Non-limiting examples of such binder materials include alumina, zirconia, silica, magnesia, thoria, titania, boria and combinations thereof, generally in the form of dried inorganic oxide gels and gelatinous precipitates. Suitable clay materials include, by way of example, bentonite, kieselguhr and combinations thereof. The relative proportion of suitable crystalline molecular sieve of the total catalyst composition may vary widely with the molecular sieve content ranging from 30 to 90 percent by weight and more usually in the range of 40 to 70 percent by weight of the composition. The catalyst composition may be in the form of an extrudate, beads or fluidizable microspheres.

The molecular sieve for use herein or the catalyst composition comprising it may have original cations replaced, in accordance with techniques well known in the art, at least in part, by ion exchange with hydrogen or hydrogen precursor cations and/or non-noble metal ions of Group VIII of the Periodic Table, i.e. nickel, iron and/or cobalt.

In broader aspects of the invention, the olefin-containing product stream can have a wide variety of compositions. The fraction could simply be the gaseous (noncondensed) fraction that includes CO, CO2, ethylene, propylene, and numerous other components and may include higher olefins. The olefin-containing product could also contain alkynes such as ethyne, propyne, butyne or the like. In other embodiments, the fraction could be a relatively olefin-rich stream that is separated from a relatively olefin-poor stream. Examples of separation techniques that can be used in a polymer conversion system include: cryogenic separation, distillation, membrane separation, adsorptive separation, or reactive separation. In some preferred embodiments, the olefin-containing product comprises at least 20 mass % olefins, in some embodiments, at least 50 mass % olefins, and in some embodiments, in the range of 20 to 90 mass % olefins or more. Other gases in the olefin-containing fraction could include methane, ethane, propane, CO, CO2, water, propadiene, methyl acetylene, H2, or N2, or some combination thereof.

The olefin product stream from the catalytic pyrolysis (the raw feed from the pyrolysis, prior to purification) can comprise C2-C4 alkenes including: ethylene, propylene, butylene, butadienes. The olefin content can be in the range of 1-70 wt %, or 5-65 wt %, or 10-60 wt %, or 20-50 wt %, or 30-45 wt %, or 40-65 wt %, or 50-70 wt %, or at least 20 wt %, or at least 30 wt %, or at least 40 wt %, or at least 50 wt %, or at least 60 wt %. The mass ratio of ethylene to propylene can vary from 0.2 to 3 depending on reaction conditions and feedstock. The mass ratio of butenes to propylene can vary between 0.05 and 0.25. Other minor components such as C5-C7 olefins are present in much smaller mass ratios to propylene, generally less than 0.1.

In some embodiments the mass yield of olefins is at least 30%, or at least 40%, or at least 45%, or at least 50%, or at least 55%, or at least 60%, or from 20% to 70%, or from 30% to 65%, or from 45% to 60%, based on the mass in the polymer or plastic feed. In some embodiments the mass yield of BTX is at least 10%, or at least 20%, or at least 30%, or at least 40% or at least 50%, or from 3% to 60%, or from 5% to 50%, or from 10% to 50%, or from 20 to 50%, based on the mass of the plastic or polymer feed to the process. In some embodiments, the mass yield of coke and char is less than 10%, or less than 5%, or less than 2%, or less than 1%, or less than 0.5%, or from 0.1% to 10%, or from 0.2% to 5%, or from 0.3 to 2%, based on the mass in the polymer or plastic fed. In some embodiments, the mass yield of olefins plus aromatics is greater than 60%, or greater than 70% or greater than 80%, or greater than 85%, or greater than 90%, or from 70% to 99%, or from 80% to 98%, or from 85% to 95%, or from 90% to 93%, based on the mass in the polymer or plastic fed. In some embodiments, the selectivity of ethylene as a percentage of the total olefins produced is at least 20%, or at least 25%, or at least 30%, or from 10% to 40%, or from 20% to 35%, or from 25% to 30%. In some embodiments the selectivity of propylene as a percentage of the total olefins produced is at least 20%, or at least 30%, or at least 40%, or at least 45%, or at least 50%, or from 20% to 70%, or from 30% to 65%, or from 45% to 55%. In some embodiments the selectivity of benzene plus toluene plus xylenes as a percentage of aromatics produced is at least 70%, or at least 80%, or at least 90%, or at least 95%, or at least 97%, or from 70% to 99.9%, or from 80% to 99.5%, or from 90 to 99%, or from 95% to 98%.

Olefin mixtures produced by the inventive process can be separated and purified by conventional cryogenic distillation, membrane separation, hybrid membrane distillation, selective adsorption, or facilitated transport systems as are known in the art. Impurities such as CO2, HCl, HCN, or H2S can be removed by amine scrubbing or caustic scrubbing or other conventional means known to those skilled in the art. Removal of impurities can be optionally performed before or after the separation of the olefins from the other vapor components.

Aromatics mixtures produced by the inventive process can be separated and purified by conventional distillation, membrane separation, hybrid membrane distillation, selective adsorption, or facilitated transport systems as are known in the art. Impurities such as phenols, thiols, thiophenes, nitriles, amines, or other oxygen, sulfur, or nitrogen containing impurities can be removed by hydrotreating or other conventional means known to those skilled in the art. Removal of impurities can be optionally performed before or after the separation of the aromatics from the other condensable components.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but, rather, listing exemplary components.

Examples 1 Through 21

Figure 3:
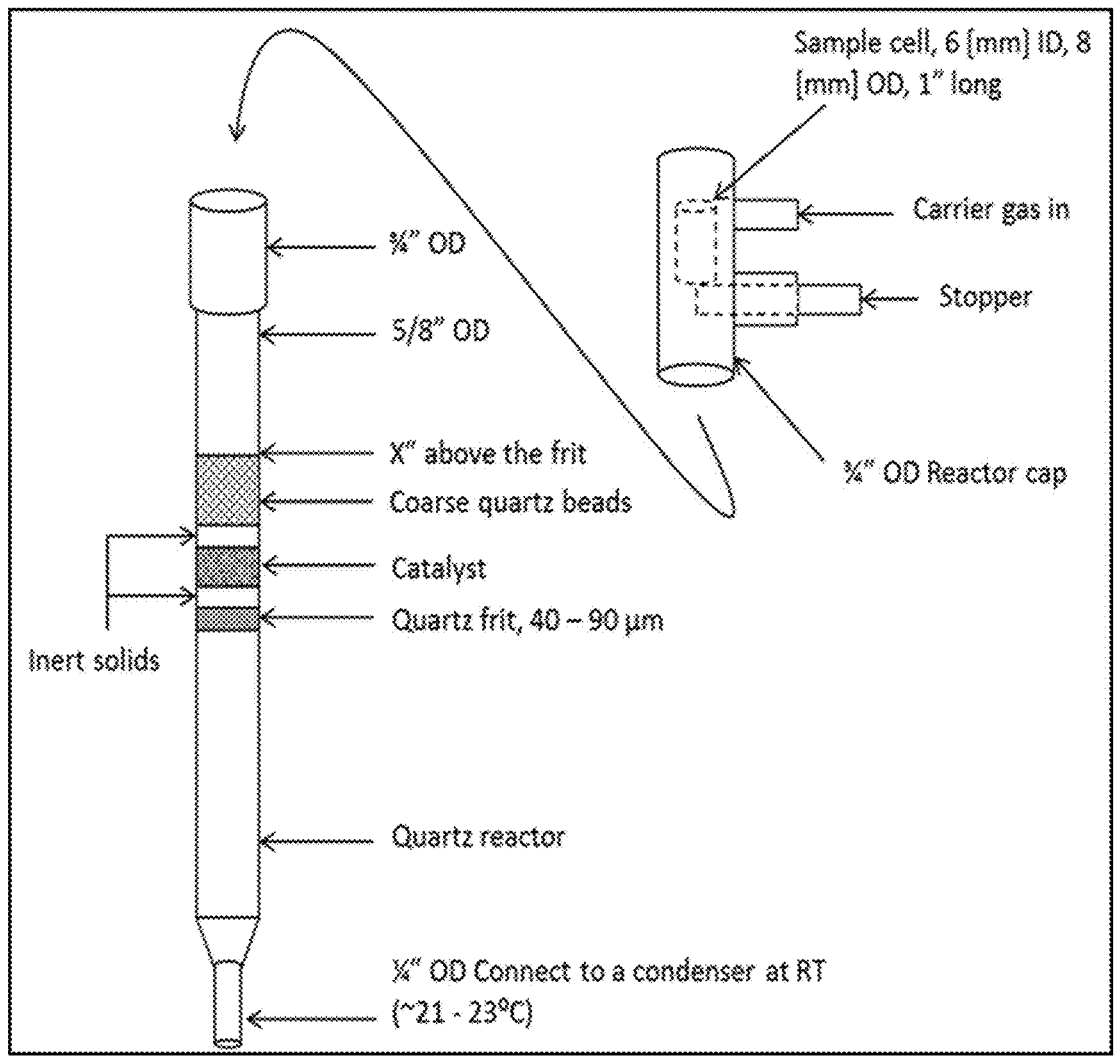
FIG. 3 is a schematic of the drop-tube reactor system.

A drop-tube reactor comprises a quartz reactor tube (ACE Glass) containing a quartz frit (40-90 μm) fused into the center of the tube. FIG. 7 shows the configuration of the drop-tube reactor. A sample cell (10 mm OD, 8 mm ID, 25 mm length, quartz, made by TGP) is used to contain the feedstock using two pieces of quartz wool (TGP). As illustrated in FIG. 3, the sample cell was placed in a reactor cap (borosilicate, ACE Glass) and was held by a stopper (¼ inch (6 mm) aluminum rod, McMaster). The reactor cap and the quartz reactor were then assembled and installed onto the fixed-bed reactor system. The bottom of the reactor was connected to a condenser (borosilicate) filled with perforated stainless steel packing (ACE Glass) immersed in an ice-water bath (0° C.). A heating mantle was applied between the reactor bottom and the condenser top to prevent any condensation before the condenser. During the reaction, the heating mantle was set at 210° C.

In the reactor, a small sample of ZSM-5 catalyst (1.5 g) was placed on top of the quartz frit. Feedstock (100 mg for each run) was sealed in a sample cell with the quartz wool. The catalyst/feedstock weight ratio was about 15. Prior to dropping the contents of the sample cell into the reactor, the catalyst was calcined at 550° C. under 100 mL/min air flow for 20 min (ramping rate=12° C./min). After calcination, the reactor was cooled to reaction temperature (500° C. for plastics and 525° C. for biomass). During the cool-down, the condenser was filled with 10 mL of solvent (ethyl acetate for plastics conversion, and acetone for biomass conversion) and held for 10 min for temperature lineout. The reactor system was then purged with helium flow at 75 mL/min for 20 min to remove air and to purge the gas collection lines.

The sample cell was dropped into the reactor by pulling out the stopper rod to initiate the reaction.

A hold period of 10 min allowed the reaction to complete. Gas products, consisting mostly of permanent gases and C1-C3 olefins and paraffins were collected in a gas bag. Liquid products (mostly C4+) were collected in the condenser. After reaction the temperature was increased to 650° C. without gas flow. Solid products, including coke and char remaining in the reactor, were then burned at 650° C. for 10 min under 50 mL/min air flow. The gas products during burning were collected in a second gas bag. An additional 3 mL of solvent was added to the condenser to extract any products remaining on the top of the condenser. All of the liquid in the condenser was then transferred to a 20 mL sample vial. A weighed amount of internal standard (dioxane, typically 3000-5000 mg, Sigma-Aldrich) was added to the sample vial.

The condenser was washed with acetone and was dried in a drying oven. It is noted that a small amount of liquid was retained in the condenser due to holdup on the packing. Therefore, the weight of the condenser with and without liquid products was measured to obtain the total amount of liquid products. Liquid samples were analyzed by a GC-FID (gas chromatograph with flame ionization detector from Shimadzu 2010Plus) for hydrocarbons and oxygenates. Gas bag samples were analyzed using an Agilent GC 7890B gas chromatograph.

The results of the experiments for various feeds are presented in TABLE 1. The balances of the products unaccounted for in TABLE comprise water, inert solids, and minor components not readily recovered for combustion.

For the experiment with PVC as the feed, the results presented in Table 1 show that the yield of olefins (4.32%) and the yield of BTX (5.15%) are low compared to the other materials. Based on only the carbon and hydrogen in the PVC, the yields of olefins and BTX are 10.0% and 11.9%, respectively, still far below other polymers. The Bronsted acidity of the catalyst recovered from the PVC reaction had dropped from 70 µmol/g to 44 µmol/g, indicative of considerable decomposition. There was considerable solid material deposited at the end of the reactor outlet, which is believed to comprise catalyst decomposition products and other unknowns.

The yields of olefins and aromatics are lower than those obtained with polyethylene, showing that materials like PVC that contains chlorine, a heteroatom, reduces the yields of useful products in a catalytic pyrolysis process. The deposition of solid materials derived from the catalyst shows that chlorine-containing plastics damage the catalyst and will sharply reduce catalyst life.

What is claimed is:

1. A method of converting a mixture comprising plastics to olefins, or aromatics, or both, comprising:
   a. providing a first mixture comprising the mixture comprising plastics and removing heteroatom containing materials from the feed mixture by use of a robotic mechanical system for removing materials;
   b. mechanically and/or thermally processing of the remaining mixture;
   c. feeding the mixture to a pyrolysis reactor;
   d. pyrolyzing the remaining feed mixture within the reactor in the presence of a catalyst under reaction

TABLE 1

Products of catalytic pyrolysis of various materials with ZSM-5 catalyst in drop tube experiments. All values are weight percent.

| Ex. No. | Feed | BTX | Other C5+ Liquid | Coke and Char | Olefins | Paraffins | H2 | CO | CO2 | Total | Aromatics + Olefins |
|---|---|---|---|---|---|---|---|---|---|---|---|
| 1 | Polyethylene (PE) | 52.8 | 3.5 | 0.9 | 18.1 | 16.4 | 2.6 | 0.3 | 0.3 | 94.8 | 70.9 |
| 2 | Polypropylene (PP) | 45.6 | 4.0 | 0.7 | 21.5 | 16.5 | 2.4 | 0 | 0.2 | 90.8 | 67.1 |
| 3 | High Density Polyethylene (HDPE) | 53.05 | 3.47 | 1.05 | 17.25 | 18.53 | 2.7 | 0 | 0.21 | 96.3 | 70.30 |
| 4 | Poly-Isoprene | 32.88 | 10.03 | 1.29 | 10.43 | 5.89 | 1.29 | 0 | 0.28 | 62.1 | 43.31 |
| 5 | Tire Sidewall | 14.94 | 3.13 | 21.62 | 8.25 | 2.08 | 0.9 | 0.56 | 0.95 | 59.4 | 23.19 |
| 6 | Tire Tread | 13.9 | 2.99 | 20.37 | 7.53 | 2.12 | 0.94 | 0.25 | 0.8 | 55.9 | 21.43 |
| 7 | Biomass | 5.96 | 1.34 | 23.69 | 2.95 | 2.66 | 0.58 | 17.4 | 9.4 | 64.0 | 8.91 |
| 8 | Cellulose | 4.8 | 1.13 | 18.74 | 2.76 | 2.06 | 0.42 | 13.0 | 13.0 | 55.9 | 7.56 |
| 9 | Cotton Clothing | 5.97 | 1.32 | 16.68 | 3.47 | 2.02 | 0.49 | 14.6 | 15.72 | 60.3 | 9.44 |
| 10 | PET | 23.73 | 3.92 | 17.76 | 4.98 | 1.16 | 0.38 | 7.65 | 34.13 | 93.7 | 28.71 |
| 11 | PET Clothing | 23.06 | 4.12 | 16.96 | 2.17 | 1.3 | 0.38 | 7.37 | 31.67 | 87.0 | 25.23 |
| 12 | Cellulose Acetate | 7.85 | 1.45 | 14.99 | 5.44 | 2.62 | 0.41 | 9.58 | 25.31 | 67.7 | 13.29 |
| 13 | Polystyrene (PS) | 38.51 | 36.29 | 4.13 | 5.58 | 1.49 | 0.48 | 0 | 0.33 | 86.8 | 44.09 |
| 14 | Nylon | 10.08 | 6.2 | 10.0 | 16.57 | 1.23 | 1.2 | 3.72 | 4.19 | 53.2 | 26.65 |
| 15 | ABS | 18.33 | 28.78 | 9.95 | 6.26 | 1.27 | 0.56 | — | 1.45* | 67.34 | 24.59 |
| 16 | Polycarbonate | 11.33 | 4.46 | 29.75 | 1.60 | 2.02 | 0.62 | — | 29.75* | 63.21 | 12.93 |
| 17 | Poly lactic acid | 14.29 | 1.07 | 3.57 | 7.34 | 3.16 | 0.07 | — | 55.37* | 84.88 | 21.63 |
| 18 | Polyurethane | 19.71 | 2.95 | 11.78 | 6.50 | 2.65 | 0.96 | — | 29.49* | 74.20 | 26.21 |
| 19 | Acrylic PMMA | 26.46 | 2.01 | 6.42 | 8.85 | 5.67 | 1.36 | — | 37.69* | 89.26 | 35/31 |
| 20 | Acetal | 4.55 | 0.61 | 10.49 | 2.72 | 3.24 | 3.71 | — | 59.95* | 85.28 | 7.27 |
| 21 | PVC | 5.15 | 2.26 | 20.95 | 4.32 | 1.29 | 0.90 |  | 0.06 | 34.92# | 9.47 |

*Sum of CO + CO2.
Cl is not included. If HCl is included, the mass balance is 91%.

conditions sufficient to produce a raw product mixture comprising one or more olefins, or one or more aromatics, or both.

2. A method of converting a mixed feed of materials, comprising:
   a. providing a first stream comprising one or more polymers;
   b. separating heteroatom containing materials from the first stream by robotic mechanical separation to produce a separated second stream and a heteroatom containing stream;
   c. feeding the second stream of materials to a fluidized bed pyrolysis reactor comprising a catalyst;
   d. pyrolyzing the second stream in the reactor;
   e. transferring at least a portion of the used catalyst with coke to a regenerator where the coke is reacted with oxygen or air to form hot regenerated catalyst and returning at least a portion of the hot regenerated catalyst to the fluidized bed reactor wherein heat from the hot regenerated catalyst provides energy to the step of pyrolyzing.

3. A method of catalytically pyrolyzing a feed mixture comprising a mixture of polymers in a fluidized bed reactor wherein at least a portion of the heteroatom containing materials have been robotically mechanically separated from the feed and the amount of oxygen introduced into the process is at least enough such that combustion of feed materials or other components with the introduced oxygen increases the temperature of the reacting mixture by at least 25° C., or at least 100° C., or at least 200° C., or at least 300° C., or from 50° C. to 400° C., or from 100° C. to 400° C., or from 200° C. to 400° C.

4. The method of claim 1 wherein the materials to be removed comprise one or more heteroatoms selected from among oxygen, nitrogen, sulfur, chlorine, bromine, iodine, alkali or alkaline earth metals, and transition metals.

5. The method of claim 1 wherein the robotic mechanical separation comprises:
   a. Identifying the objects to be removed from a waste feed mixture;
   b. Gripping the objects to be removed with an articulated robotic arm;
   c. Removing the objects identified to be removed;
   d. Processing the remaining materials in a pyrolysis or catalytic pyrolysis process.

6. The method of claim 5 wherein the robotic mechanical separation comprises:
   a. at least one robot arm provided with a gripping member;
   b. an artificial visualization system, one or more sensors, or both, allowing the localization of objects, and partial recognition of their nature;
   c. a means for processing the information supplied by the vision system or by the one or more sensors, or both, and a means of piloting the robotic arm for the selective removal of the objects comprising heteroatoms.

7. The method of claim 5 wherein the objects to be removed are gripped mechanically by suction, compression, mechanical action, vacuum system, or some combination of these.

8. The method of claim 5 wherein step b) comprises employing at least one sensor to identify the objects to be removed by recognizing their constituent material.

9. The method of claim 8 wherein the one or more sensors detect objects using Fourier Transform Near Infra-Red (FT-NIR) spectroscopy, optical vision systems, or X-ray fluorescence.

10. The method of claim 1 wherein characterization data obtained by the mechanical robotic separation unit are collected, stored, and analyzed using artificial intelligence to enhance the accuracy of the separation process.

11. The method of claim 1 wherein the feed mixture materials are selected from biomass, polyethylene (PE), polypropylene (PP), polyacetylene, polybutylene, polyolefins, polyethylene terephthalate (PET), polybutyleneterephthalate, copolyesters, polyester, polycarbonate, polyurethanes, polyamides, polystyrene (PS), polyacetal, epoxies, polycyanurates, polyacrylics, polyurea, vinyl esters, polyacrylonitrile, polyvinyl alcohol, polyvinylchloride (PVC), polyvinyl acetate, nylon, copolymers such as: ethylene-propylene, EPDM, acrylonitrile-butadienestyrene (ABS), nitrile rubber, natural and synthetic rubber, tires, styrene-butadiene, styrene-acrylonitrile, styrene-isoprene, styrene-maleic anhydride, ethylene-vinylacetate, nylon 6, nylon 66, nylon 12, nylon 46, filled polymers, polymer composites, plastic alloys, other polymeric materials, and polymers or plastics dissolved in a solvent, whether obtained from polymer or plastic manufacturing processes as waste or discarded materials, post-consumer recycled polymer materials, materials separated from waste streams such as municipal solid waste, black liquor, wood waste, or other biologically produced materials, or some combination of these.

12. The method of claim 3 wherein the feed mixture materials comprise PVC, or PVDC, or both PVC and PVDC that are removed from the feedstream.

13. The method of claim 3 wherein the feed mixture materials comprise multi-layer packaging that comprises one or more metallic components and that are removed from the feedstream.

14. The method of claim 3 wherein the mixture of polymers is molten and further comprising filtering solids from the molten mixture prior to pyrolyzing.

15. The method of claim 2 wherein the feed or mixture of polymers comprises at least 80 mass % of polyethylene or polypropylene, or a combination of both.

16. The method of claim 2 wherein the polymer or mixture of polymers comprises at least 80 mass % of PET or other polyesters.

17. The method of any of claims 2 or 3 wherein olefins, or aromatics, or aromatics and olefins are recovered from the product stream.

18. The method of claim 2 wherein at least a portion of the product gases is combusted in the catalyst regeneration unit.

19. The method of any of claims 1-6 wherein the catalytic pyrolysis is conducted in a fluidized bed, circulating bed, bubbling bed, or riser reactor at an operating temperature in the range from 300° C. to 800° C., or from 350° C. to 700° C., or from 400° C. to 650° C., or from 450° C. to 625° C., or from 500° C. to 600° C.

20. The method of claim 2 wherein the step of pyrolyzing comprises a zeolite catalyst.

* * * * *